United States Patent
Lenius et al.

(10) Patent No.: US 9,299,731 B1
(45) Date of Patent: Mar. 29, 2016

(54) SYSTEMS AND METHODS FOR SELECTABLE PHOTODIODE CIRCUITS

(71) Applicant: Google Inc., Mountain View, CA (US)

(72) Inventors: Samuel William Lenius, Mountain View, CA (US); Pierre-yves Droz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 14/042,700

(22) Filed: Sep. 30, 2013

(51) Int. Cl.
| | |
|---|---|
| H01J 40/14 | (2006.01) |
| G06M 7/00 | (2006.01) |
| G01C 21/02 | (2006.01) |
| H01L 27/144 | (2006.01) |
| G01S 17/06 | (2006.01) |

(52) U.S. Cl.
CPC ............ *H01L 27/144* (2013.01); *G01S 17/06* (2013.01); *B60R 2300/301* (2013.01)

(58) Field of Classification Search
CPC ................ B60R 2300/30; B60R 2300/301
USPC ......... 250/221, 203.1–203.7, 214 R, 214 SW, 250/214.1; 356/3–22; 235/414–416; 348/135–161; 396/89, 121–123, 396/125–129
See application file for complete search history.

(56) References Cited

U.S. PATENT DOCUMENTS

| | | | |
|---|---|---|---|
| 3,790,277 A | 2/1974 | Hogan | |
| 3,811,774 A * | 5/1974 | Honeycutt | ............ G01S 17/325 356/28 |
| 4,234,965 A | 11/1980 | Bickley et al. | |
| 4,700,301 A | 10/1987 | Dyke | |
| 4,709,195 A | 11/1987 | Hellekson et al. | |
| 5,202,742 A | 4/1993 | Frank et al. | |
| 5,382,791 A * | 1/1995 | Leff | ...................... G08B 25/016 250/208.4 |
| 5,469,174 A | 11/1995 | McCorkle | |
| 6,693,271 B2 * | 2/2004 | O'Connor | ................ G01V 8/12 250/214 AL |
| 7,030,614 B2 | 4/2006 | Matschl et al. | |
| 7,089,114 B1 | 8/2006 | Huang | |
| 7,248,342 B1 | 7/2007 | Degnan | |
| 7,255,275 B2 | 8/2007 | Gurevich et al. | |
| 7,759,757 B2 | 7/2010 | Koide et al. | |
| 7,969,558 B2 | 6/2011 | Hall | |
| 2013/0023870 A1 | 1/2013 | Collins | |

* cited by examiner

*Primary Examiner* — Pascal M Bui Pho
(74) *Attorney, Agent, or Firm* — McDonnell Boehnen Hulbert & Berghoff LLP

(57) ABSTRACT

Example systems and methods include a receiving circuit and selectable photodiode circuits. Each selectable photodiode circuit includes (i) a photodiode having a photodiode anode and a photodiode cathode, where the photodiode is configured to generate a selectable input, (ii) a bias voltage source connected to the photodiode cathode, (iii) a connecting resistor connected to the photodiode anode, (iv) a switchable power supply connected to the connecting resistor, where the switchable power supply is configured to operate in a high state and a low state, and (v) a PIN diode having a PIN anode and a PIN cathode, where the PIN cathode is connected to the photodiode anode and the connecting resistor, and the PIN anode is connected to the receiving circuit. The selectable photodiode circuit is configured to provide the selectable input to the receiving circuit only when the switchable power supply operates in the low state.

20 Claims, 5 Drawing Sheets

SYSTEMS AND METHODS FOR SELECTABLE PHOTODIODE CIRCUITS

BACKGROUND

Unless otherwise indicated herein, the materials described in this section are not prior art to the claims in this application and are not admitted to be prior art by inclusion in this section.

In various applications, it may be desirable to allow for selection among a number of inputs received at once. Typically, such selection is achieved using a multiplexer.

SUMMARY

Disclosed are selectable photodiode circuits configured to select among inputs generated by a number of photodiodes through the use of PIN diodes.

In some cases, it may be desirable for light-sensing devices, such as a light detection and ranging (LIDAR) device or an imaging device, to include a number of photodiodes. The photodiodes may, for example, be arranged in an array. Each of the photodiodes may be configured to absorb light incident on the photodiode, causing a current to flow in the photodiode. As a result, upon absorbing light, each photodiode may generate an input.

In the light-sensing device, it may be desirable to select among the inputs generated at the photodiodes. To this end, each photodiode may be included in a selectable photodiode circuit. The selectable photodiode circuit may include, in addition to the photodiode, a PIN diode and a switchable power supply configured to switch between a high state and a low state. The selectable photodiode circuit may be configured to select (e.g., provide to a receiving circuit) the input generated at the photodiode when the switchable power supply is in the low state. Additionally, the selectable photodiode circuit may be configured to deselect (e.g., isolate from the receiving circuit) the input generated at the photodiode when the switchable power supply is in the high state.

An example device is disclosed that includes a receiving circuit and a number of selectable photodiode circuits. Each selectable photodiode circuit includes (i) a photodiode having a photodiode anode and a photodiode cathode, where the photodiode is configured to generate a selectable input, (ii) a bias voltage source connected to the photodiode cathode, (iii) a connecting resistor connected to the photodiode anode, (iv) a switchable power supply connected to the connecting resistor, where the switchable power supply is configured to operate in a high state and a low state, and (v) a PIN diode having a PIN anode and a PIN cathode, where the PIN cathode is connected to the photodiode anode and the connecting resistor, and the PIN anode is connected to the receiving circuit. The selectable photodiode circuit is configured to (a) provide the selectable input to the receiving circuit when the switchable power supply operates in the low state and (b) isolate the selectable input from the receiving circuit when the switchable power supply operates in the high state.

An example LIDAR device is also disclosed that includes a receiving circuit and an array of selectable photodiode circuits. Each selectable photodiode circuit includes (i) a photodiode having a photodiode anode and a photodiode cathode, where the photodiode is configured to generate a selectable input, (ii) a bias voltage source connected to the photodiode cathode, (iii) a connecting resistor connected to the photodiode anode, (iv) a switchable power supply connected to the connecting resistor, where the switchable power supply is configured to operate in a high state and a low state, and (v) a PIN diode having a PIN anode and a PIN cathode, where the PIN cathode is connected to the photodiode anode and the connecting resistor, and the PIN anode is connected to the receiving circuit. The selectable photodiode circuit is configured to (a) provide the selectable input to the receiving circuit when the switchable power supply operates in the low state and (b) isolate the selectable input from the receiving circuit when the switchable power supply operates in the high state.

An example image-sensing device is also disclosed that includes a receiving circuit and an array of selectable photodiode circuits. Each selectable photodiode circuit includes (i) a photodiode having a photodiode anode and a photodiode cathode, where the photodiode is configured to generate a selectable input, (ii) a bias voltage source connected to the photodiode cathode, (iii) a connecting resistor connected to the photodiode anode, (iv) a switchable power supply connected to the connecting resistor, where the switchable power supply is configured to operate in a high state and a low state, and (v) a PIN diode having a PIN anode and a PIN cathode, where the PIN cathode is connected to the photodiode anode and the connecting resistor, and the PIN anode is connected to the receiving circuit. The selectable photodiode circuit is configured to (a) provide the selectable input to the receiving circuit when the switchable power supply operates in the low state and (b) isolate the selectable input from the receiving circuit when the switchable power supply operates in the high state.

These as well as other aspects, advantages, and alternatives, will become apparent to those of ordinary skill in the art by reading the following detailed description, with reference where appropriate to the accompanying drawings.

DETAILED DESCRIPTION

Light-sensing devices, such as light detection and ranging (LIDAR) devices and imaging devices, among others, may be configured to sense light using a number of photodiodes. To this end, the photodiodes in a light-sensing device may be arranged in, for example, an array. Each photodiode in the array may be configured to absorb light on the photodiode, and, upon absorbing light, to generate an input.

In the light-sensing device, it may be desirable to select among the inputs generated at the photodiodes. While, as noted above, multiplexers are typically used to select among inputs in other applications, typical multiplexers exhibit intrinsic capacitance, which results in slow switching among selected inputs. Further, the typical sizes and typical shapes of multiplexers are incompatible with some light-sensing devices, including, for example, disposed on a flexible substrate. Still further, as typical multiplexers are only configured to select among a limited number of inputs, multiplexers may be inadequate to select among the inputs generated at the array of photodiodes.

To this end, each photodiode may be included in a selectable photodiode circuit. Each selectable photodiode circuit may include, in addition to the photodiode, a PIN diode and a switchable power supply configured to switch between a high state and a low state.

The selectable photodiode circuit may be configured to select (e.g., provide to a receiving circuit) the input generated at the photodiode when the switchable power supply is in the low state. Further, the selectable photodiode circuit may be configured to deselect (e.g., isolate from the receiving circuit) the input generated at the photodiode when the switchable power supply is in the high state.

An example selectable photodiode circuit is described below in connection with FIG. 1. An example light-sensing device including selectable photodiode circuits is described below in connection with FIG. 2. FIG. 3 illustrates an example LIDAR device including selectable photodiode circuits.

Figure 1:
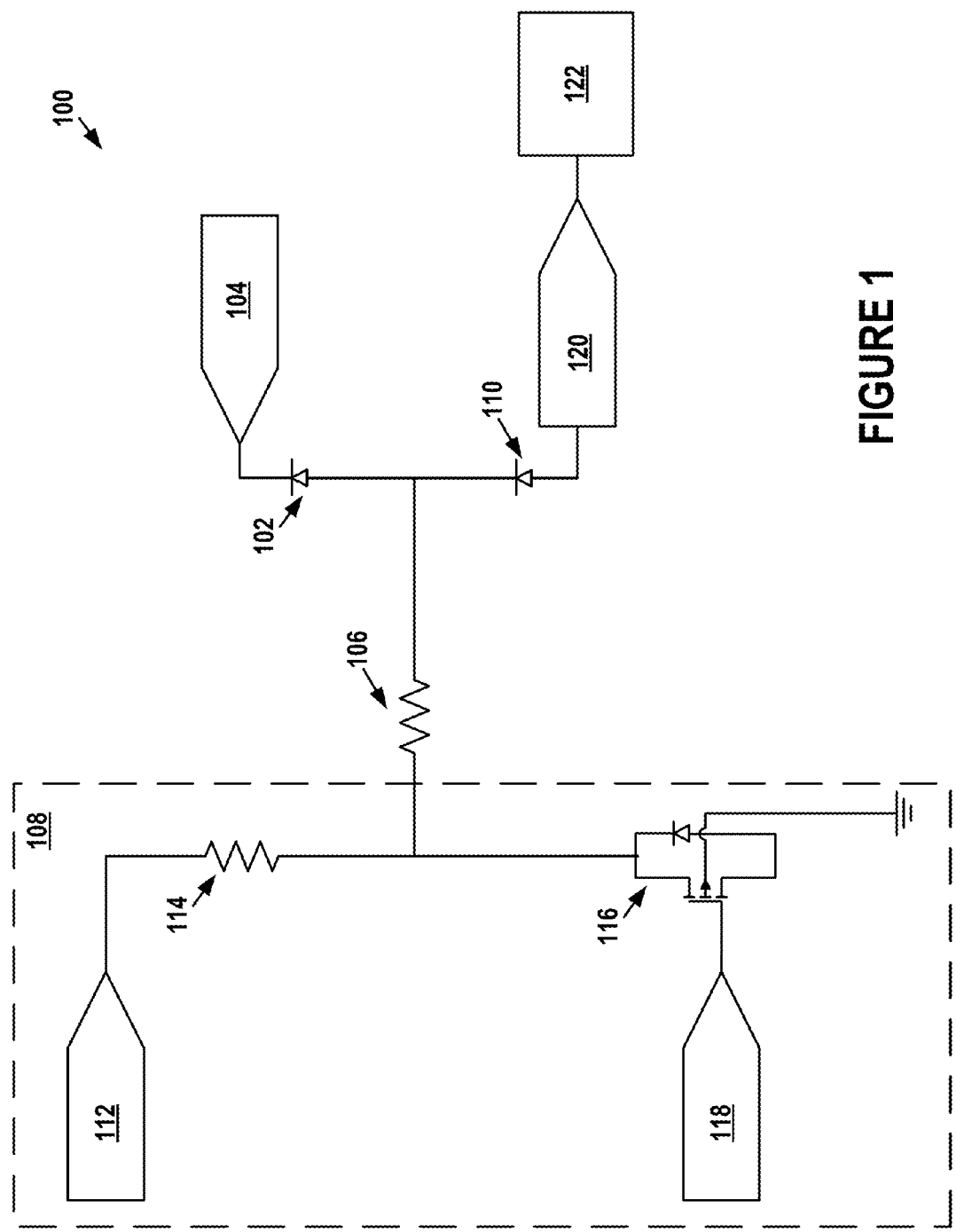
FIG. 1 is a diagram of an example selectable photodiode circuit.

FIG. 1 is a diagram of an example selectable photodiode circuit 100. As shown, the selectable photodiode circuit 100 includes a photodiode 102, a bias voltage 104, a connecting resistor 106, a switchable power supply 108, and a PIN diode 110.

As shown, the photodiode 102 includes a photodiode anode and a photodiode cathode. The photodiode 102 may be configured to absorb light and, upon absorbing light, to generate a selectable input. To this end, the photodiode 102 may be, for example, an avalanche photodiode. Other photodiodes are possible as well.

Further, as shown, the PIN diode 110 includes a PIN cathode and a PIN anode. The PIN cathode may be connected to the photodiode anode of the photodiode 102 as well as the connecting resistor 106. The PIN anode may be connected to an output 120. The output 120 may be connected to (or connectable to) a receiving circuit 122. In some embodiments, the receiving circuit 122 may be, for example, an amplifying circuit and/or a processing circuit. Other receiving circuits are possible as well. Through the output 120, the PIN anode of the PIN diode 110 may be further connected to a pull-up voltage in the receiving circuit 122 via a pull-up resistor (not shown). The pull-up resistor may have a resistance on the order of, for example, 20 kΩ. Other resistances are possible as well. The pull-up resistor may be, for example, a thick film, thin film, metal film, metal oxide film, and/or carbon film resistor. Other resistors are possible as well.

The PIN diode 110 may include a p-doped semiconductor region and an n-doped semiconductor region separated by a wide, lightly doped near-intrinsic semiconductor region. The p-doped semiconductor region may form the PIN anode of the PIN diode 110, while the n-doped semiconductor region may form the PIN cathode of the PIN diode 110.

As will be understood, the PIN diode 110 may operate in an equilibrium state, a forward biased state, and a reverse biased state. In the equilibrium state, also called the zero-bias state, an equilibrium condition may be reached in the PIN diode 110, such that an equilibrium voltage (or built-in potential) appears across the PIN diode 110. When the PIN anode of the PIN diode 110 is connected to a higher voltage than the PIN cathode of the PIN diode 110, the PIN diode 110 becomes forward biased. When forward biased, the PIN diode 110 exhibits a reduced resistance, allowing a current to flow through the PIN diode 110. By contrast, when the PIN anode of the PIN diode 110 is connected to a lower voltage than the PIN cathode of the PIN diode 110, the PIN diode 110 becomes reverse biased. When reverse biased, the PIN diode 110 exhibits an increased resistance, such that substantially no current flows through the PIN diode 110. Due to the wide, lightly doped near-intrinsic region, the PIN diode 110 may exhibit a low intrinsic capacitance. As a result, the PIN diode 110 may allow for fast switching between being forward biased and being reverse biased.

As shown, the bias voltage 104 may be connected to the photodiode cathode of the photodiode 102. The bias voltage source 104 may be configured to provide a constant (i.e., non-varying) bias voltage. The bias voltage may be provided from, for example, another circuit and/or a power supply (not shown).

The connecting resistor 106 is shown to be connected to the photodiode anode of the photodiode 102, the PIN cathode of the PIN diode 110, and the switchable power supply 108. The connecting resistor 106 may have a resistance on the order of, for example, 2 kΩ. Other resistances are possible as well. The connecting resistor 106 may be, for example, a thick film, thin film, metal film, metal oxide film, and/or carbon film resistor. Other resistors are possible as well.

As shown, the switchable power supply 108 is connected to the connecting resistor 106. The switchable power supply 108 may include a power supply 112, a supply resistor 114, and a semiconductor switch 116 with a select 118. The supply resistor 112 may have a resistance on the order of, for example, 30 kΩ. Other resistances are possible as well. The supply resistor 112 may be, for example, a thick film, thin film, metal film, metal oxide film, and/or carbon film resistor. Other resistors are possible as well. The semiconductor switch 116 may be, for example, a field effect transistor. Other semiconductor switches are possible as well.

As shown, the connecting resistor 106 is connected to the semiconductor switch 116. Further, the connecting resistor 106 is connected to the power supply 112 via the supply resistor 114. The select 118 may be configured to switch the switchable power supply 108 (via the semiconductor switch 116) between a high state and a low state. To this end, the select 118 may be controlled by, for example, a controller (not shown), such as a computer system, that is electrically coupled to the select 118.

When the switchable power supply 108 operates in the high state, the semiconductor switch 116 may be open, and the power supply 108 may provide a supply voltage to the connecting resistor 106 through the supply resistor 114. Thus, in the high state, the PIN cathode of the PIN diode 110 may be connected to the supply voltage. When the switchable power supply 108 operates in the low state, the semiconductor switch 116 may be closed, and the connecting resistor 106 may be connected to ground through the semiconductor switch 116. Thus, in the low state, the PIN cathode of the PIN diode 110 may be connected to ground.

In general, the supply voltage may be greater than the pull-up voltage but less than a breakdown voltage of the PIN diode 110. For example, the supply voltage may be on the order of, for example, 48V. Other supply voltages are possible as well. The pull-up voltage may, for example, be on the order of 5V. Other pull-up voltages are possible as well.

In operation, when the photodiode 102 absorbs light, the photodiode 102 may generate a selectable input. The selectable input may take the form of a current flowing from the photodiode 102 to the PIN diode 110. The selectable input may be referred to as "selectable" because, as described below, the switchable power supply 118 may be configured to switch the PIN diode 110 between being forward biased and being reverse biased, thereby switching between providing the selectable input to the receiving circuit 122 and isolating the selectable input from the receiving circuit 122, respectively.

As noted above, the switchable power supply 108 may be configured to operate in a high state and a low state. When operating in the high state, the switchable power supply 112 may output the supply voltage to the connecting resistor 106, such that the PIN cathode of the PIN diode 110 is connected to the supply voltage, as described above. The PIN anode of the PIN diode 110 may be connected to the pull-up voltage from the receiving circuit 122. Because the supply voltage is greater than the pull-up voltage (such that the PIN anode of the PIN diode 110 is connected to a lower voltage than the PIN cathode of the PIN diode 110), the PIN diode 110 may become reverse biased, and substantially no current may pass through the PIN diode 110, as described above. As a result, the selectable input generated by the photodiode 102 may be isolated from the receiving circuit 122. Thus, when the switchable power supply 112 operates in the high state, the PIN diode 110 may be reverse biased, and the selectable input may be isolated from the receiving circuit 122.

By contrast, as described above, when operating in the low state, the switchable power supply 112 may connect the connecting resistor 106 to ground via the semiconductor switch 116, such that the PIN cathode of the PIN diode 110 is connected to ground. The anode of the PIN diode 110 may be connected to the pull-up voltage in the receiving circuit 122. Because the pull-up voltage is greater than ground (such that the PIN anode of the PIN diode 110 is connected to a higher voltage than the PIN cathode of the PIN diode 110), the PIN diode 110 may become forward biased, and current may pass through the PIN diode 110, as described above. As a result, the selectable input generated by the photodiode 102 may be provided to the receiving circuit 122. Thus, when the switchable power supply 112 operates in the low state, the PIN diode 110 may be forward biased, and the selectable input may be provided to the receiving circuit 122. When the selectable input is provided to the receiving circuit 122, a voltage at the output 120 may reflect a voltage across the PIN diode 110, which may in turn reflect the selectable input. In particular, the voltage at the output 120 may be related to (e.g., a function of) a derivative of the selectable input. For instance, if the selectable input takes the form of a pulse of current that passes through the PIN diode 110, the voltage at the output 120 may initially rise at the beginning of the pulse, cross zero at a point corresponding to the peak of the pulse, and then go negative as the pulse falls away. Other examples are possible as well.

In some applications, it may be desirable to include a number of selectable photodiode circuits in a light-sensing device. For example, it may be desirable to include an array of selectable photodiode circuits in the light-sensing device. The array of selectable photodiode circuits may allow spatial light sensing by the light-sensing device.

Figure 2:
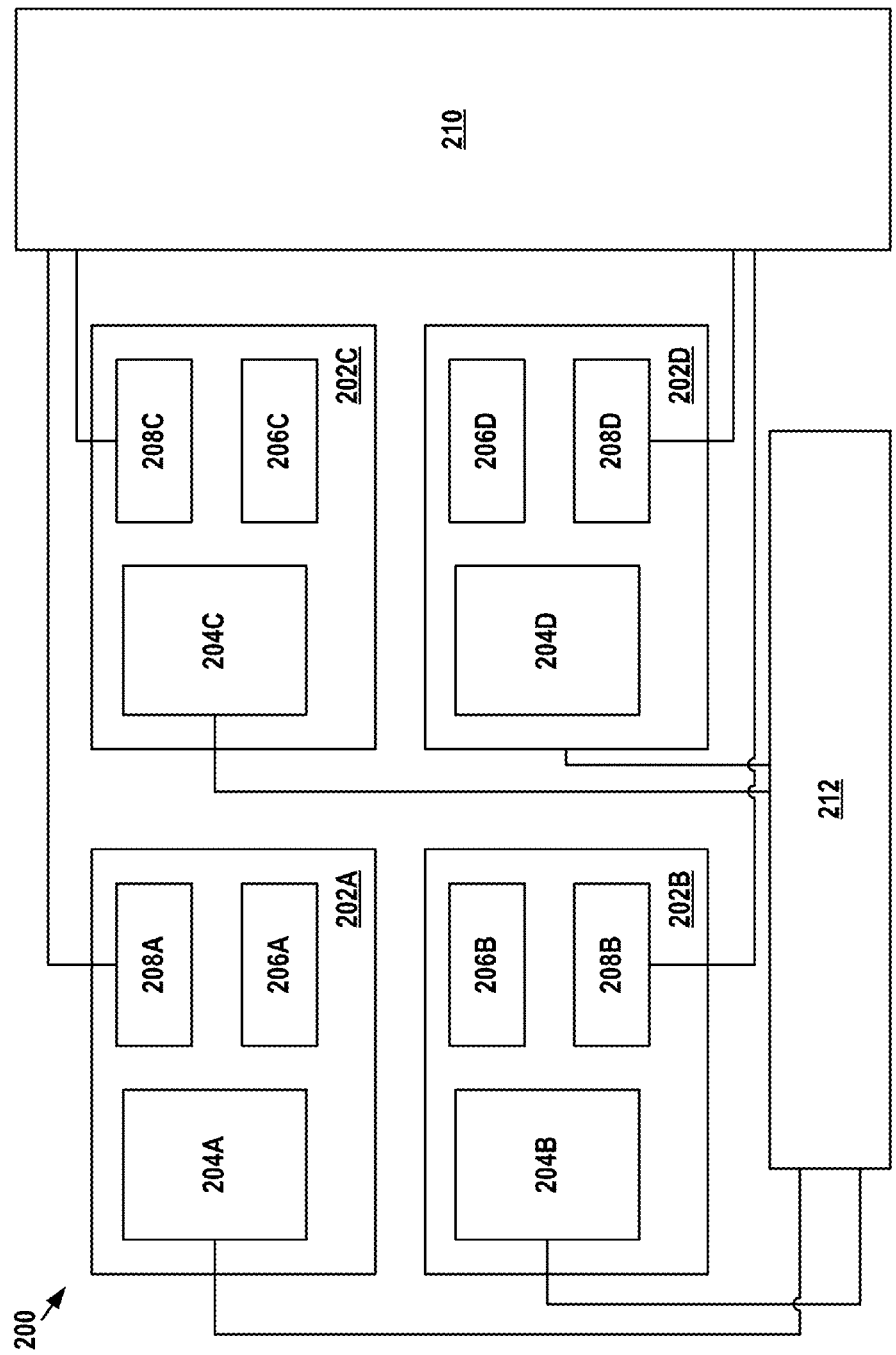
FIG. 2 is a diagram of an example light-sensing device including an array of selectable photodiode circuits.
Figure 3:
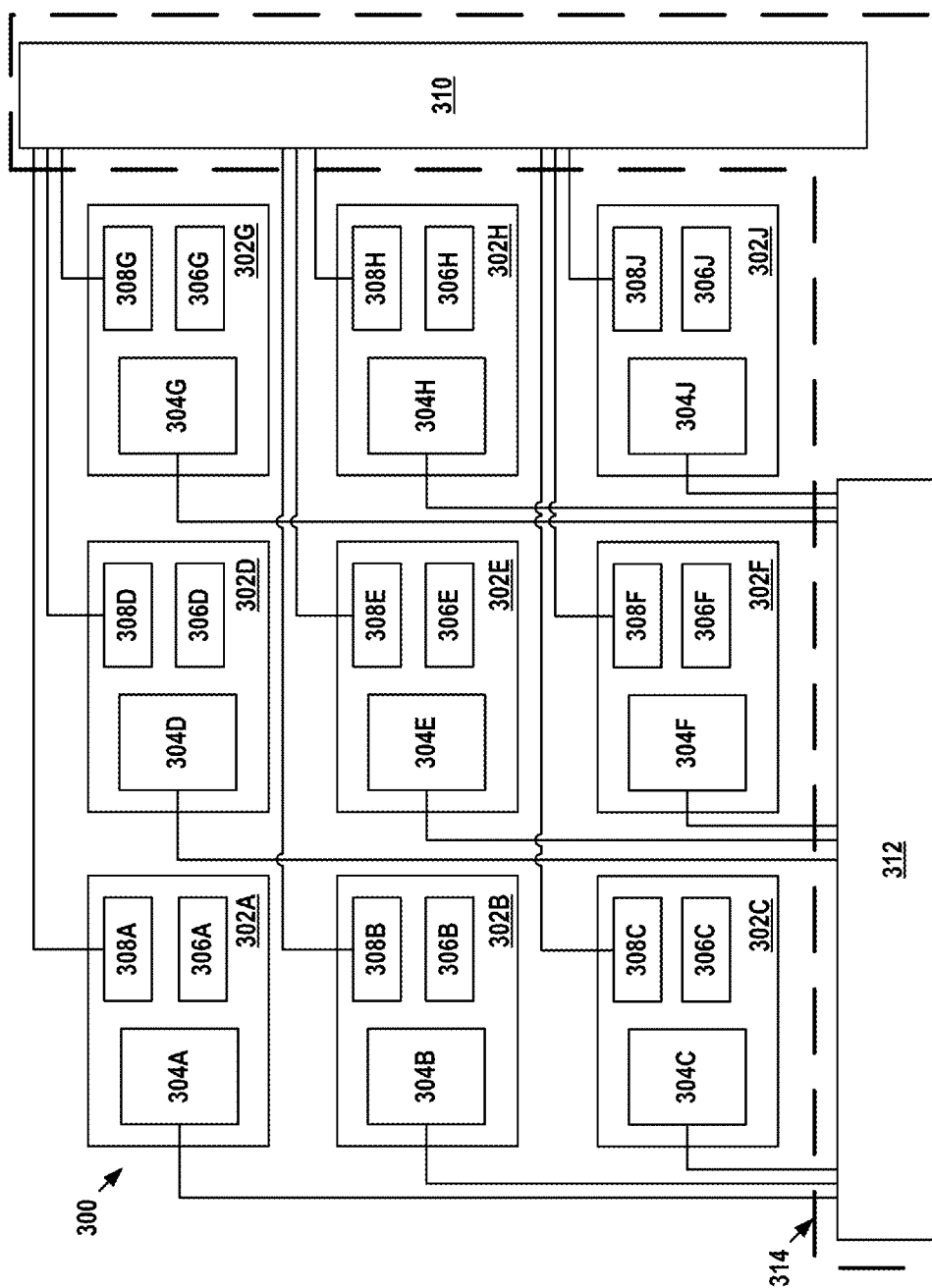
FIG. 3 is a schematic illustration of an example LIDAR device including an array of selectable photodiode circuits.

FIG. 2 is a diagram of an example light-sensing device 200 including an array of selectable photodiode circuits 202A-D. While the example light-sensing device 200 is shown to include four selectable photodiode circuits 202A-D, it will be understood that more or fewer selectable photodiode circuits 202A-D are possible as well. Further, while the selectable photodiode circuits 202A-D are arranged in a two-by-two array, it will be understood that other arrays of other dimensions and/or other shapes are possible as well.

Each of the selectable photodiode circuits 202A-D may be similar to the selectable photodiode circuit 100 described above in connection with FIG. 1. For clarity, each of the selectable photodiode circuits 202A-D is shown as a block diagram and is shown to include a switchable power supply 204A-D, a photodiode 206A-D, and a PIN diode 208A-D. Each of the switchable power supplies 204A-D, the photodiodes 206A-D, and the PIN diodes 208A-D may take any of the forms described above for the power supply 112, the photodiode 102, and the PIN diode 110, respectively, in connection with FIG. 1.

It will be understood that the additional elements of the selectable photodiode circuit 100 described above in connection with FIG. 1, while not shown, may additionally be included in the selectable photodiode circuits 202A-D. In particular, while not shown, a photodiode cathode of each of the photodiodes 206A-D may be connected to a bias voltage. Each of the photodiode cathodes may be connected to a respective bias voltage, each of the photodiode cathodes may be connected to a common bias voltage, or some of the photodiode cathodes may be connected to a common bias voltage while others of the photodiode cathodes may be connected to another or other bias voltage(s).

Each of the photodiodes 206A-D may be configured to absorb light and, upon absorbing light, to generate a selectable input, as described above. To this end, each of the photodiodes 206A-D may be, for example, an avalanche photodiode. Other photodiodes are possible as well.

Each of the switchable power supplies 204A-D may include a power supply and a semiconductor switch with a select, as described above. The select in each of the switchable power supplies 204A-D may be configured to control the semiconductor switch to switch the switchable power supply 204A-D between a high state and a low state, as described above.

As shown, the light-sensing device 200 further includes a receiving circuit 210. The receiving circuit 210 may be, for example, an amplifying circuit and/or a processing circuit. Other receiving circuits are possible as well. The receiving circuit 210 may include a pull-up voltage, as described above, and a PIN anode of each of the PIN diodes 208A-D may be connected to the pull-up voltage via a pull-up resistor in the receiving circuit 210. The pull-up voltage and the pull-up resistor may take any of the forms described above for the pull-up voltage and the pull-up resistor described above in connection with FIG. 1.

The light-sensing device 200 is shown to further include a controller 212. The controller 212 may be connected to each of the switchable power supplies 204A-D, as shown. While a single controller 212 is shown to be connected to each of the switchable power supplies 204A-D, in some embodiments the light-sensing device 200 may include more than one controller 212. In these embodiments, each of the switchable power supplies 204A-D may be connected to a respective controller 212, or some of the switchable power supplies 204A-D may be connected to the same controller 212 while others of the switchable power supplies 204A-D may be connected to another or other controller(s) 212. The controller 212 may be, for example, a computer system, or a processor within a computer system.

In general, the controller 212 may be configured to switch each of the switchable power supplies 204A-D between the high state and the low state. To this end, the controller 212 may be connected to the select in each of the switchable power supplies 204A-D, and may be configured to control the select to switch the switchable power supply 204A-D between the high state and the low state. When operating in the high state, the selectable photodiode circuits 202A-D may isolate the selectable inputs from the receiving circuit 210, as described above. Further, when operating in the low state, the selectable photodiode circuits 202A-D may provide the selectable inputs to the receiving circuit 210, as described above.

In operation, the controller 212 may determine which of the selectable inputs from the photodiodes 206A-D is to be provided to the receiving circuit 210. For example, the controller 212 may determine that the selectable inputs from photodiodes 206A and 206D are to be isolated from the receiving circuit 210, while the selectable inputs from photodiodes 206B and 206C are to be provided to the receiving circuit 210. To this end, the controller 212 may control the selects in the switchable power supplies 204A and 204D to switch the switchable power supplies 204A and 204D (via the semiconductor switches) to operate in the high state. Further, the controller 212 may control the selects in the switchable power supplies 204B and 204C to switch the switchable power supplies 204B and 204C (via the semiconductor switches) to operate in the low state.

When the switchable power supplies 204A and 204D operate in the high state, the PIN diodes 208A and 208D, respectively, may be reverse biased, as described above. When reverse biased, the PIN diodes 208A and 208D may not pass current, thereby isolating the selectable inputs generated by the photodiodes 206A and 206D, respectively, from the receiving circuit 210.

When the switchable power supplies 204B and 204C operate in the low state, the PIN diodes 208B and 208C, respectively, may be forward biased, as described above. When forward biased, the PIN diodes 208B and 208C may pass current, thereby providing the selectable inputs generated by the photodiodes 206B and 206C to the receiving circuit 210.

Thereafter, for example, the controller 212 may determine that the selectable inputs from photodiodes 206A and 206B are to be isolated from the receiving circuit 210, while the selectable inputs from photodiodes 206C and 206D are to be provided to the receiving circuit 210. To this end, the controller 212 may control the select in the switchable power supply 204B to switch the switchable power supply 204B (via the semiconductor switch) from operating in the low state to operating in the high state. Further, the controller 212 may control the select in the switchable power supply 204D to switch the switchable power supply 204D (via the semiconductor switch) from operating in the high state to operating in the low state.

When the switchable power supply 204B switches to operating in the high state, the PIN diode 208B may switch from being forward biased to being reverse biased. When reverse biased, the PIN diode 208B may not pass current, thereby isolating the selectable input generated by the photodiode 206B from the receiving circuit 210.

When the switchable power supply 204D switches to operating in the low state, the PIN diode 208D may switch from being reverse biased to being forward biased. When forward biased, the PIN diode 208D may pass current, thereby providing the selectable input generated by the photodiode 206D to the receiving circuit 210.

In this manner, the controller 212 may dynamically control the switchable power supplies 204A-D to switch between operating in the high and low state, thereby switching between isolating the selectable inputs from and providing the selectable inputs to the receiving circuit 210, as described above.

An example application of selectable photodiode circuits is a LIDAR device. LIDAR devices may be configured for remote sensing using light. In particular, LIDAR devices may be configured to illuminate a target using light (e.g., laser light), sense reflections of the light off the target, and generate an image of the target based on the sensed reflections. In some cases, a LIDAR device may sense the reflections using photodiodes, such as avalanche photodiodes. The photodiodes may be configured to, upon sensing the reflections, generate an input, as described above.

In some cases, it may be desirable to sense reflections using only some (and not all) of the photodiodes included in the LIDAR device and/or to provide inputs generated by the photodiodes to various destinations (e.g., different processing circuits). To this end, the selectable photodiode circuits described above may be used to selectively isolate some inputs from and provide some inputs to a receiving circuit in or connected to the LIDAR device.

FIG. 3 is a schematic illustration of an example LIDAR device 300 including an array of selectable photodiode circuits 302A-J. While the example LIDAR device 300 is shown to include nine selectable photodiode circuits 302A-J, it will be understood that more or fewer selectable photodiode circuits 302A-J are possible as well. Further, while the selectable photodiode circuits 302A-J are arranged in a three-by-three array, it will be understood that other arrays of other dimensions and/or other shapes are possible as well.

Each of the selectable photodiode circuits 302A-J may take any of the forms described above in connection with the selectable photodiode circuit 100 in connection with FIG. 1 and/or the selectable photodiode circuits 202A-D described above in connection with FIG. 2. As shown, each of the selectable photodiode circuits 302A-J includes a switchable power supply 304A-J, a photodiode 306A-J, and a PIN diode 308A-J. Each of the switchable power supplies 304A-J, the photodiodes 306A-J, and the PIN diodes 308A-J may take any of the forms described above for the power supply 112, the photodiode 102, and the PIN diode 110, respectively, in connection with FIG. 1.

It will be understood that the additional elements of the selectable photodiode circuit 100 described above in connection with FIG. 1, while not shown, may additionally be included in the selectable photodiode circuits 302A-J. In particular, while not shown, a photodiode cathode of each of the photodiodes 306A-J may be connected to a bias voltage. Each of the photodiode cathodes may be connected to a respective bias voltage, each of the photodiode cathodes may be connected to a common bias voltage, or some of the photodiode cathodes may be connected to a common bias voltage while others of the photodiode cathodes may be connected to another or other bias voltage(s).

As shown, the LIDAR device 300 additionally includes a receiving circuit 310 and a controller 312. The receiving circuit 310 and the controller 312 may take any of the forms described above for the receiving circuit 210 and the controller 212 in connection with FIG. 2. In some embodiments, the receiving circuit 310 and/or the controller 312 may be included in the LIDAR device 300. For example, in embodiments where the LIDAR device 300 is encased in a housing, the receiving circuit 310 and/or the controller 312 may be included in the housing. In other embodiments, the receiving circuit 310 and/or the controller 312 may be separate from and connected (connectable) to the LIDAR device 300. For example, in some embodiments the LIDAR device 300 may be designed to be implemented with a vehicle 314, such as an autonomous vehicle. In these embodiments, the receiving circuit 310 and/or the controller 312 may be included in the vehicle 314, as shown. In these embodiments, the receiving circuit 310 and/or the controller 312 may be included in a computer system at the vehicle 314. In embodiments where the vehicle 314 is an autonomous vehicle, the computer system may be configured to operate the vehicle 314 in an autonomous mode. In particular, the computer system may be configured to use the selectable inputs from the photodiodes at the LIDAR device 300 to sense surroundings of the vehicle 314 and to navigate the vehicle 314 based on the sensed surroundings. Other examples, including other applications of the LIDAR device 300, are possible as well.

In operation, the controller 312 may determine which of the selectable inputs from the photodiodes 306A-J is to be provided to the receiving circuit 310. For example, the controller 312 may determine that the selectable inputs from photodiodes 306A-C are to be isolated from the receiving circuit 312, while the selectable inputs from photodiodes 306D-J are to be provided to the receiving circuit 312. To this end, the controller 312 may control the selects in the switchable power supplies 304A-C to switch the switchable power supplies 304A-C (via the semiconductor switches) to operate in the high state. Further, the controller 312 may control the selects in the switchable power supplies 304D-J to switch the switchable power supplies 304D-J (via the semiconductor switches) to operate in the low state.

When the switchable power supplies 304A-C operate in the high state, the PIN diodes 308A-C, respectively, may be reverse biased, as described above, thereby isolating the selectable inputs generated by the photodiodes 306A-C, respectively, from the receiving circuit 310.

When the switchable power supplies 304D-J operate in the low state, the PIN diodes 308D-J, respectively, may be forward biased, as described above, thereby providing the selectable inputs generated by the photodiodes 306D-J to the receiving circuit 310.

It will be understood that, as described above, the controller 310 may dynamically control the switchable power supplies 304A-J to switch between operating in the high and low state and vice versa, thereby switching between isolating the selectable inputs from and providing the selectable inputs to the receiving circuit 310. In this manner, the selectable photodiode circuits 302A-J may enable the LIDAR device 300 to selectively provide inputs from the photodiodes 306A-J to the receiving circuit 310.

As noted above, the selectable photodiode circuits may, in some embodiments, be implemented in an autonomous vehicle, such as the vehicle 314. An example autonomous vehicle is described below in connection with FIGS. 4 and 5.

Figure 4:
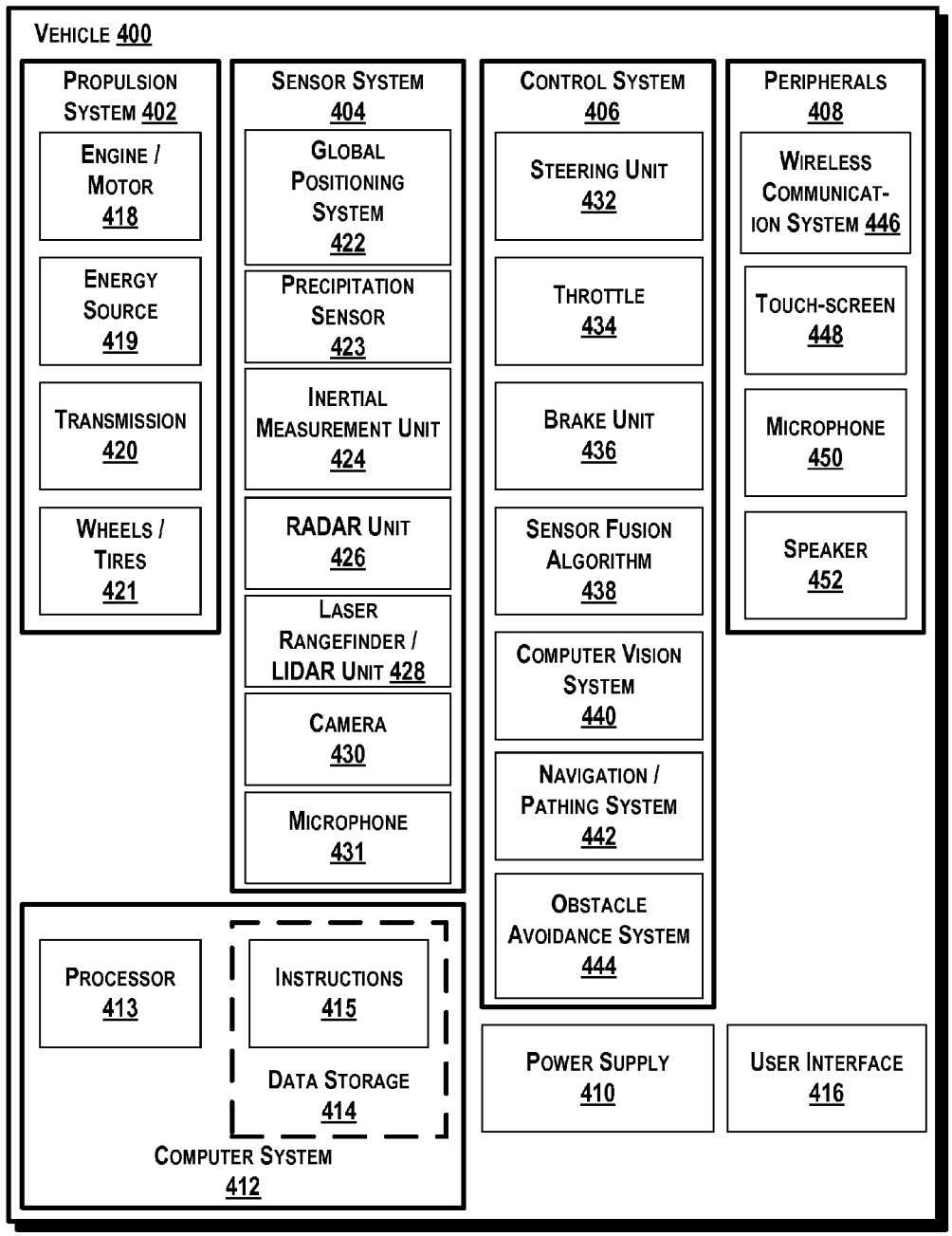
FIG. 4 is a functional block diagram depicting a vehicle.

FIG. 4 is a functional block diagram depicting a vehicle 400 according to an example embodiment. The vehicle 400 is configured to operate fully or partially in an autonomous mode, and thus may be referred to as an "autonomous vehicle." For example, a computer system 412 may control the vehicle 400 while in an autonomous mode via control instructions to a control system 406 for the vehicle 400. The computer system 412 may receive information from a sensor system 404, and base one or more control processes (such as the setting a heading so as to avoid a detected obstacle) upon the received information in an automated fashion.

The vehicle 400 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 400 may include various subsystems such as a propulsion system 402, a sensor system 404, a control system 406, one or more peripherals 408, as well as a power supply 410, a computer system 412, and a user interface 416. The vehicle 400 may include more or fewer subsystems and each subsystem may include multiple elements. Further, each of the subsystems and elements of vehicle 400 may be interconnected. Thus, one or more of the described functions of the vehicle 400 may be divided up into additional functional or physical components, or combined into fewer functional or physical components. In some further examples, additional functional and/or physical components may be added to the examples illustrated by FIG. 4.

The propulsion system 402 may include components operable to provide powered motion to the vehicle 400. Depending upon the embodiment, the propulsion system 402 may include an engine/motor 418, an energy source 419, a transmission 420, and wheels/tires 421. The engine/motor 418 could be any combination of an internal combustion engine, an electric motor, steam engine, Stirling engine, or other types of engines and/or motors. In some embodiments, the propulsion system 402 may include multiple types of engines and/or motors. For instance, a gas-electric hybrid vehicle may include a gasoline engine and an electric motor. Other examples are possible as well.

The energy source 419 may represent a source of energy that may, in full or in part, power the engine/motor 418. That is, the engine/motor 418 may be configured to convert the energy source 419 into mechanical energy to operate the transmission 420. Examples of energy sources 419 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 419 may also provide energy for other systems of the vehicle 400.

The transmission 420 may include elements that are operable to transmit mechanical power from the engine/motor 418 to the wheels/tires 421. Such elements may include a gearbox, a clutch, a differential, a drive shaft, and/or axle(s), etc. The transmission 420 may include other elements as well. The drive shafts may include one or more axles that may be coupled to the one or more wheels/tires 421.

The wheels/tires 421 may be arranged to stably support the vehicle 400 while providing frictional traction with a surface, such as a road, upon which the vehicle 400 moves. Accordingly, the wheels/tires 421 of vehicle 400 may be configured in various formats, including a unicycle, bicycle/motorcycle, tricycle, or car/truck four-wheel format. Other wheel/tire geometries are possible, such as those including six or more wheels. Any combination of the wheels/tires 421 of vehicle 400 may be operable to rotate differentially with respect to other wheels/tires 421. The wheels/tires 421 may represent at least one wheel that is fixedly attached to the transmission 420 and at least one tire coupled to a rim of the wheel that could make contact with the driving surface. The wheels/tires 421 may include any combination of metal and rubber, or another combination of materials.

The sensor system 404 generally includes one or more sensors configured to detect information about the environment surrounding the vehicle 400. For example, the sensor system 404 may include a Global Positioning System (GPS) 422, a precipitation sensor 423, an inertial measurement unit (IMU) 424, a RADAR unit 426 (radio detection and ranging), a laser rangefinder/LIDAR unit 428 (laser imaging detection and ranging), a camera 430, and/or a microphone 431. The sensor system 404 may also include sensors configured to monitor internal systems of the vehicle 400 (e.g., $O_2$ monitor, fuel gauge, engine oil temperature, wheel speed sensors, etc.). One or more of the sensors included in the sensor system 404 may be configured to be actuated separately and/or collectively in order to modify a position and/or an orientation of the one or more sensors.

Sensors in the sensor system 404 may be configured to provide data that is processed by the computer system 412 in real-time. For example, sensors may continuously update outputs to reflect an environment being sensed at or over a range of time, and continuously or as-demanded provide that updated output to the computer system 412 so that the computer system 412 can determine whether the vehicle's then current direction or speed should be modified in response to the sensed environment.

The GPS 422 may be any sensor configured to estimate a geographic location of the vehicle 400. To this end, GPS 422 may include a transceiver operable to provide information regarding the position of the vehicle 400 with respect to the Earth.

The precipitation sensor 423 may be mounted under or incorporated into a windshield of the vehicle 400. Precipitation sensors may also be mounted at various other locations, such as at or near a location of headlamps, etc. In one example, the precipitation sensor 423 may include a set of one or more infrared light-emitting diodes (LEDs) and a photodetector such as a photodiode. Light emitted by the LEDs may be reflected by the windshield back to the photodiode. The less light the photodiode receives may be indicative of the more precipitation outside of the vehicle 400. An amount of reflected light or some other indicator of the detected amount of precipitation may be passed to computer system 412.

The IMU 424 may include any combination of sensors (e.g., accelerometers and gyroscopes) configured to sense position and orientation changes of the vehicle 400 based on inertial acceleration.

The RADAR unit 426 may represent a system that utilizes radio signals to sense objects within the local environment of the vehicle 400. In some embodiments, in addition to sensing the objects, the RADAR unit 426 may additionally be configured to sense the speed and/or heading of the objects.

Similarly, the laser rangefinder or LIDAR unit 428 may be any sensor configured to sense objects in the environment in which the vehicle 400 is located using lasers. Depending upon the embodiment, the laser rangefinder/LIDAR unit 428 could include one or more laser sources, a laser scanner, and one or more detectors, among other system components. The laser rangefinder/LIDAR unit 428 could be configured to operate in a coherent (e.g., using heterodyne detection) or an incoherent detection mode.

The camera 430 may include one or more devices configured to capture a plurality of images of the environment surrounding the vehicle 400. The camera 430 may be a still camera or a video camera. In some embodiments, the camera 430 may be mechanically movable such as by rotating and/or tilting a platform to which the camera is mounted. As such, a control process of the vehicle 400 may be implemented to control the movement of the camera 430.

The sensor system 404 may also include a microphone 431. The microphone 431 may be configured to capture sound from the environment surrounding the vehicle 400. In some cases, multiple microphones can be arranged as a microphone array, or possibly as multiple microphone arrays.

The control system 406 may be configured to control operation(s) of the vehicle 400 and its components. Accordingly, the control system 406 may include various elements include steering unit 432, throttle 434, brake unit 436, a sensor fusion algorithm 438, a computer vision system 440, a navigation/pathing system 442, and an obstacle avoidance system 444, etc.

The steering unit 432 may represent any combination of mechanisms that may be operable to adjust the heading of vehicle 400. For example, the steering unit 432 can adjust the axis (or axes) of one or more of the wheels/tires 421 so as to effect turning of the vehicle 400. The throttle 434 may be configured to control, for instance, the operating speed of the engine/motor 418 and, in turn, control the speed of the vehicle 400. The brake unit 436 may include any combination of mechanisms configured to decelerate the vehicle 400. The brake unit 436 may, for example, use friction to slow the wheels/tires 421. In other embodiments, the brake unit 436 inductively decelerates the wheels/tires 421 by a regenerative braking process to convert kinetic energy of the wheels/tires 421 to electric current. The brake unit 436 may take other forms as well.

The sensor fusion algorithm 438 may be an algorithm (or a computer program product storing an algorithm) configured to accept data from the sensor system 404 as an input. The data may include, for example, data representing information sensed at the sensors of the sensor system 404. The sensor fusion algorithm 438 may include or be configured to be executed using, for instance, a Kalman filter, Bayesian network, or other algorithm. The sensor fusion algorithm 438 may provide various assessments based on the data from sensor system 404. Depending upon the embodiment, the assessments may include evaluations of individual objects and/or features in the environment of vehicle 400, evaluations of particular situations, and/or evaluations of possible impacts based on the particular situation. Other assessments are possible.

The computer vision system 440 may be any system operable to process and analyze images captured by camera 430 in order to identify objects and/or features in the environment of vehicle 400 that could include traffic signals, road way boundaries, other vehicles, pedestrians, and/or obstacles, etc. The computer vision system 440 may use an object recognition algorithm, a Structure from Motion (SFM) algorithm, video tracking, and other computer vision techniques. In some embodiments, the computer vision system 440 could be additionally configured to map an environment, track objects, estimate the speed of objects, etc.

The navigation and pathing system 442 may be any system configured to determine a driving path for the vehicle 400. For example, the navigation/pathing system 442 may determine a series of speeds and directional headings to effect movement of the vehicle 400 along a path that substantially avoids perceived obstacles while generally advancing the vehicle 400 along a roadway-based path leading to an ultimate destination, which may be set according to user inputs via the user interface 416, for example. The navigation and pathing system 442 may additionally be configured to update the driving path dynamically while the vehicle 400 is in operation. In some embodiments, the navigation and pathing system 442 could be configured to incorporate data from the sensor fusion algorithm 438, the GPS 422, and one or more predetermined maps so as to determine the driving path for vehicle 400.

The obstacle avoidance system 444 may represent a control system configured to identify, evaluate, and avoid or otherwise negotiate potential obstacles in the environment of the vehicle 400. For example, the obstacle avoidance system 444 may effect changes in the navigation of the vehicle 400 by operating one or more subsystems in the control system 406 to undertake swerving maneuvers, turning maneuvers, braking maneuvers, etc. In some embodiments, the obstacle avoidance system 444 is configured to automatically determine feasible ("available") obstacle avoidance maneuvers on the basis of surrounding traffic patterns, road conditions, etc. For example, the obstacle avoidance system 444 may be configured such that a swerving maneuver is not undertaken when other sensor systems detect vehicles, construction barriers, other obstacles, etc. in the region adjacent the vehicle 400 that would be swerved into. In some embodiments, the obstacle avoidance system 444 may automatically select the maneuver that is both available and maximizes safety of occupants of the vehicle. For example, the obstacle avoidance system 444 may select an avoidance maneuver predicted to cause the least amount of acceleration in a passenger cabin of the vehicle 400.

The control system 406 may additionally or alternatively include components other than those shown and described.

The vehicle 400 also includes peripherals 408 configured to allow interaction between the vehicle 400 and external sensors, other vehicles, other computer systems, and/or a user, such as an occupant of the vehicle 400. For example, the peripherals 408 for receiving information from occupants, external systems, etc. may include a wireless communication system 446, a touchscreen 448, a microphone 450, and/or a speaker 452.

In some embodiments, the peripherals 408 function to receive inputs for a user of the vehicle 400 to interact with the user interface 416. To this end, the touchscreen 448 can both provide information to a user of the vehicle 400, and convey information from the user indicated via the touchscreen 448 to the user interface 416. The touchscreen 448 can be configured to sense both touch positions and touch gestures from the finger of a user (or stylus, etc.) via capacitive sensing, resistance sensing, optical sensing, a surface acoustic wave process, etc. The touchscreen 448 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 400 can also utilize a voice command interface. For example, the microphone 450 can be configured to receive audio (e.g., a voice command or other audio input) from an occupant of the vehicle 400. Similarly, the speaker 452 can be configured to output audio to the occupant of the vehicle 400.

In some embodiments, the peripherals 408 function to allow communication between the vehicle 400 and external systems, such as devices, sensors, other vehicles, etc. within its surrounding environment and/or controllers, servers, etc., physically located far from the vehicle 400 that provide useful information regarding the vehicle's surroundings, such as traffic information, weather information, etc. For example, the wireless communication system 446 can wirelessly communicate with one or more devices directly or via a communication network. The wireless communication system 446 can optionally use 3 G cellular communication, such as CDMA, EVDO, GSM/GPRS, and/or 4G cellular communication, such as WiMAX or LTE. Additionally or alternatively, the wireless communication system 446 can communicate with a wireless local area network (WLAN), for example, using WiFi. In some embodiments, the wireless communication system 446 could communicate directly with a device, for example, using an infrared link, short-range wireless link, etc. The wireless communication system 446 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 446 within the context of the present disclosure.

The power supply 410 may provide power to components of the vehicle 400, such as electronics in the peripherals 408, the computer system 412, the sensor system 404, etc. The power supply 410 can include a rechargeable lithium-ion or lead-acid battery for storing and discharging electrical energy to the various powered components, for example. In some embodiments, one or more banks of batteries may be configured to provide electrical power. In some embodiments, the power supply 410 and the energy source 419 can be implemented together, as in some all-electric cars.

Many or all of the functions of the vehicle 400 may be controlled via the computer system 412 that receives inputs from the sensor system 404, the peripherals 408, etc., and communicates appropriate control signals to the propulsion system 402, the control system 406, the peripherals 408, etc. to effect automatic operation of the vehicle 400 based on its surroundings. The computer system 412 may include at least one processor 413 (which could include at least one microprocessor) that executes instructions 415 stored in a non-transitory computer readable medium, such as the data storage 414. The computer system 412 may also represent a plurality of computing devices that may serve to control individual components or subsystems of the vehicle 400 in a distributed fashion.

In some embodiments, data storage 414 may contain instructions 415 (e.g., program logic) executable by the processor 413 to execute various automobile functions, including those described above in connection with FIG. 4. Data storage 414 may contain additional instructions as well, including instructions to transmit data to, receive data from, interact with, and/or control one or more of the propulsion system 402, the sensor system 404, the control system 406, and the peripherals 408.

In addition to the instructions 415, the data storage 414 may store data such as roadway maps, path information, among other information. Such information may be used by vehicle 400 and computer system 412 at during the operation of the vehicle 400 in the autonomous, semi-autonomous, and/or manual modes.

The vehicle 400, and associated computer system 412, provides information to and/or receives input from, a user of the vehicle 400, such as an occupant in a passenger cabin of the vehicle 400. Accordingly, the vehicle 400 may include a user interface 416 for providing information to or receiving input from a user of vehicle 400. The user interface 416 may control or enable control of content and/or the layout of interactive images that could be displayed on the touchscreen 448. Further, the user interface 416 could include one or more input/output devices within the set of peripherals 408, such as the wireless communication system 446, the touchscreen 448, the microphone 450, and the speaker 452.

The computer system 412 controls the operation of the vehicle 400 based on inputs received from various subsystems indicating vehicle and/or environmental conditions (e.g., propulsion system 402, sensor system 404, and/or control system 406), as well as inputs from the user interface 416, indicating user preferences. For example, the computer system 412 may utilize input from the control system 406 to control the steering unit 432 to avoid an obstacle detected by the sensor system 404 and the obstacle avoidance system 444. The computer system 412 may be configured to control many aspects of the vehicle 400 and its subsystems. Generally, however, provisions are made for manually overriding automated controller-driven operation, such as in the event of an emergency, or merely in response to a user-activated override, etc.

The components of the vehicle 400 described herein may be configured to work in an interconnected fashion with other components within or outside their respective systems. For example, the camera 430 can capture a plurality of images that represent information about an environment of the vehicle 400 while operating in an autonomous mode. The environment may include other vehicles, traffic lights, traffic signs, road markers, pedestrians, etc. The computer vision system 440 can categorize and/or recognize various aspects in the environment in concert with the sensor fusion algorithm 438, the computer system 412, etc. based on object recognition models pre-stored in the data storage 414, and/or by other techniques.

Although FIG. 4 shows various components of vehicle 400, i.e., wireless communication system 446, computer system 412, data storage 414, and user interface 416, as being integrated into the vehicle 400, one or more of these components could be mounted or associated separately from the vehicle 400. For example, data storage 414 could, in part or in full, exist separate from the vehicle 400. Thus, the vehicle 400 could be provided in the form of device elements that may be located separately or together. The device elements that make up vehicle 400 may generally be communicatively coupled together in a wired and/or wireless fashion.

Figure 5:
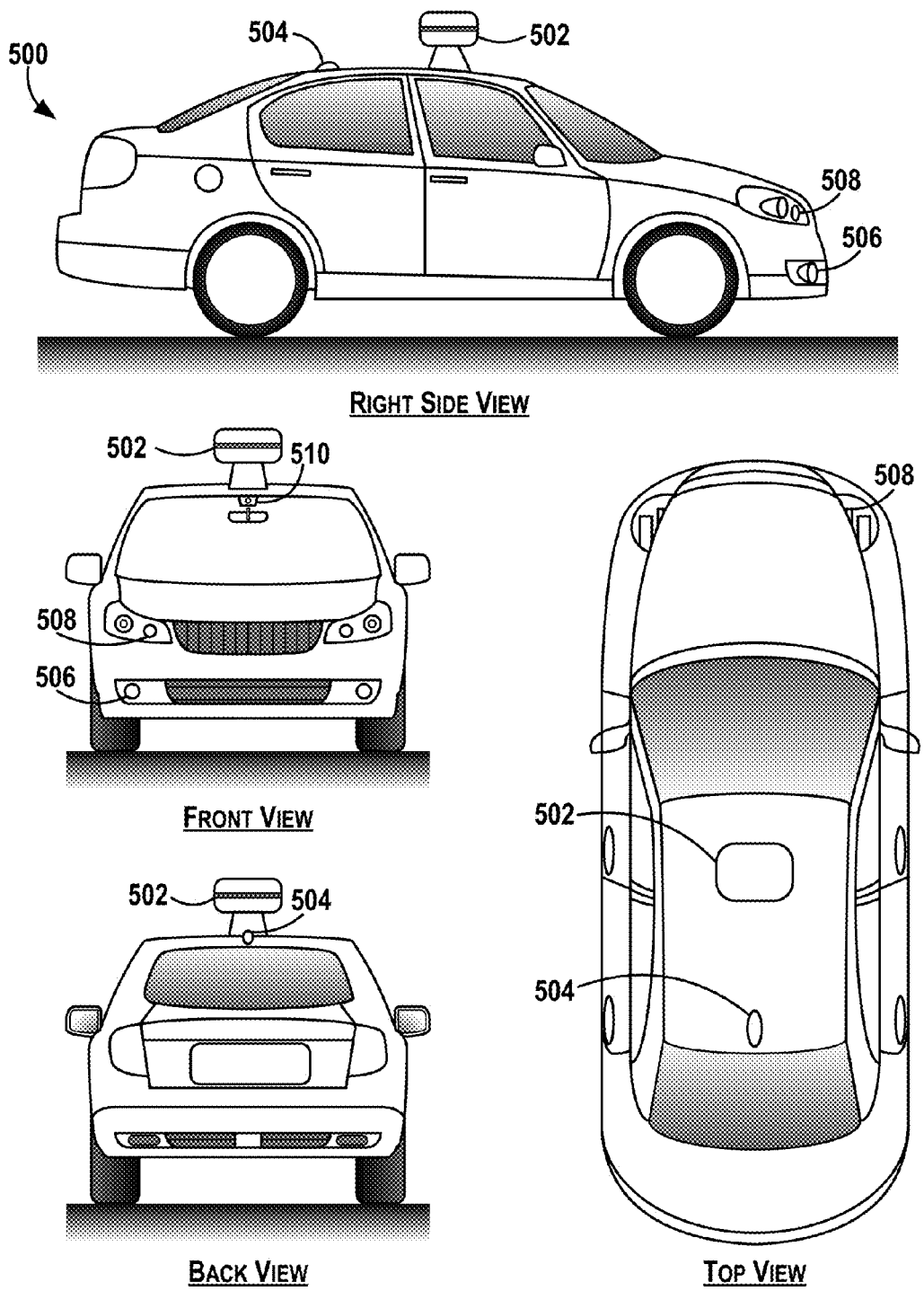
FIG. 5 depicts an example vehicle.

FIG. 5 depicts an example vehicle 500 that can include all or some of the functions described in connection with the vehicle 400 in reference to FIG. 4. Although example vehicle 500 is illustrated in FIG. 5 as a four-wheel sedan-type car for illustrative purposes, the present disclosure is not so limited. For instance, example vehicle 500 can represent any type of vehicle.

Example vehicle 500 includes a sensor unit 502, a wireless communication system 504, a LIDAR unit 506, a laser rangefinder unit 508, and a camera 510. Furthermore, example vehicle 500 may include any of the components described in connection with vehicle 400 of FIG. 4.

The sensor unit 502 is mounted atop example vehicle 500 and includes one or more sensors configured to detect information about an environment surrounding example vehicle 500, and output indications of the information. For example, the sensor unit 502 may include any combination of cameras, RADARs, LIDARs, range finders, and acoustic sensors. The sensor unit 502 may include one or more movable mounts that may be operable to adjust the orientation of one or more sensors in the sensor unit 502. In one embodiment, the movable mount may include a rotating platform that may scan sensors so as to obtain information from each direction around example vehicle 500. In another embodiment, the movable mount of the sensor unit 502 may be moveable in a scanning fashion within a particular range of angles and/or azimuths. The sensor unit 502 may be mounted atop the roof of a car, for instance, however other mounting locations are possible. Additionally, the sensors of the sensor unit 502 may be distributed in different locations and need not be collocated in a single location. Some possible sensor types and mounting locations include the LIDAR unit 506 and laser rangefinder unit 508. Furthermore, each sensor of the sensor unit 502 may be configured to be moved or scanned independently of other sensors of the sensor unit 502.

The wireless communication system 504 may be located on a roof of example vehicle 500 as depicted in FIG. 5. Alternatively, the wireless communication system 504 may be located, fully or in part, elsewhere. The wireless communication system 504 may include wireless transmitters and receivers that may be configured to communicate with devices external or internal to example vehicle 500. Specifically, the wireless communication system 504 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 510 may be a photo-sensitive instrument, such as a still camera, a video camera, etc., that is configured to capture a plurality of images of the environment of example vehicle 500. To this end, the camera 510 can be configured to detect visible light, and can additionally or alternatively be configured to detect light from other portions of the spectrum, such as infrared or ultraviolet light. The camera 510 can be a two-dimensional detector, and can optionally have a three-dimensional spatial range of sensitivity. In some embodiments, the camera 510 can include, for example, a range detector configured to generate a two-dimensional image indicating distance from the camera 510 to a number of points in the environment. To this end, the camera 510 may use one or more range detecting techniques.

For example, the camera 510 may provide range information by using a structured light technique in which example vehicle 500 illuminates an object in the environment with a predetermined light pattern, such as a grid or checkerboard pattern and uses the camera 510 to detect a reflection of the predetermined light pattern from environmental surroundings. Based on distortions in the reflected light pattern, example vehicle 500 may determine the distance to the points on the object. The predetermined light pattern may comprise infrared light, or radiation at other suitable wavelengths for such measurements.

The camera 510 may be mounted inside a front windshield of example vehicle 500. Specifically, the camera 510 may be situated to capture images from a forward-looking view with respect to the orientation of example vehicle 500. Other mounting locations and viewing angles of the camera 510 may also be used, either inside or outside example vehicle 500.

The camera 510 can have associated optics operable to provide an adjustable field of view. Further, the camera 510 may be mounted to example vehicle 500 with a movable mount to vary a pointing angle of the camera 510, such as a via a pan/tilt mechanism.

The disclosed selectable photodiode circuits may be implemented in any number of light sensing applications, including, for example, image sensing devices, such as medical imaging devices, microscopes, and cameras, and light sensing devices, such as illumination meters (e.g., for use with cameras) or illumination sensors (e.g., for use with personal electronics, displays, and/or outdoor/emergency lights). Other applications are possible as well.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:
1. A device comprising:
a receiving circuit; and
a plurality of selectable photodiode circuits, wherein each selectable photodiode circuit comprises:
(i) a photodiode comprising a photodiode anode and a photodiode cathode, wherein the photodiode is configured to generate a selectable input,
(ii) a bias voltage source connected to the photodiode cathode,
(iii) a connecting resistor connected to the photodiode anode,

(iv) a switchable power supply connected to the connecting resistor, wherein the switchable power supply is configured to operate in a high state and a low state, and (v) a PIN diode comprising a PIN anode and a PIN cathode, wherein the PIN cathode is connected to the photodiode anode and the connecting resistor, and the PIN anode is connected to the receiving circuit, wherein the selectable photodiode circuit is configured to (a) provide the selectable input to the receiving circuit when the switchable power supply operates in the low state and (b) isolate the selectable input from the receiving circuit when the switchable power supply operates in the high state.

2. The circuit of claim 1, wherein the switchable power supply comprises:

a power supply;

a supply resistor connected between the power supply and the connecting resistor;

a semiconductor switch connected between the connecting resistor and ground; and a select configured to control the semiconductor switch.

3. The circuit of claim 2, wherein:

the switchable power supply operating in the high state comprises the select controlling the semiconductor switch to be open; and the switchable power supply operating in the low state comprises the select controlling the semiconductor switch to be closed.

4. The circuit of claim 1, wherein the receiving circuit comprises an amplifying circuit.

5. The circuit of claim 1, wherein the plurality of selectable photodiode circuits comprises an array of selectable photodiode circuits.

6. The circuit of claim 1, wherein, for each selectable photodiode circuit, the selectable photodiode circuit being configured to provide the selectable input to the receiving circuit when the switchable power supply operates in the low state comprises the PIN diode being forward biased when the switchable power supply operates in the low state.

7. The circuit of claim 1, wherein, for each selectable photodiode circuit, the selectable photodiode circuit being configured to isolate the selectable input from the receiving circuit when the switchable power supply operates in the high state comprises the PIN diode being reverse biased when the switchable power supply operates in the high state.

8. The circuit of claim 1, wherein the switchable power supply being configured to operate in the high state comprises the switchable power supply providing a supply voltage to the connecting resistor.

9. The circuit of claim 8, wherein:

the receiving circuit comprises a pull-up voltage; and the supply voltage is greater than the pull-up voltage.

10. The circuit of claim 1, wherein, for each selectable photodiode circuit, the photodiode comprises an avalanche photodiode.

11. A LIDAR device comprising:

a receiving circuit; and an array of selectable photodiode circuits, wherein each selectable photodiode circuit comprises:

(i) a photodiode comprising a photodiode anode and a photodiode cathode, wherein the photodiode is configured to generate a selectable input, (ii) a bias voltage source connected to the photodiode cathode, (iii) a connecting resistor connected to the photodiode anode, (iv) a switchable power supply connected to the connecting resistor, wherein the switchable power supply is configured to operate in a high state and a low state, and (v) a PIN diode comprising a PIN anode and a PIN cathode, wherein the PIN cathode is connected to the photodiode anode and the connecting resistor, and the PIN anode is connected to the receiving circuit, wherein the selectable photodiode circuit is configured to (a) provide the selectable input to the receiving circuit when the switchable power supply operates in the low state and (b) isolate the selectable input from the receiving circuit when the switchable power supply operates in the high state.

12. The LIDAR device of claim 11, wherein the LIDAR device is implemented in a vehicle comprising a computer system.

13. The LIDAR device of claim 12, wherein, for each selectable photodiode circuit, the computer system is configured to switch the switchable power supply between the high state and the low state.

14. The LIDAR device of claim 12, wherein, for each selectable photodiode circuit, the receiving circuit is configured to output to the computer system an output that is a function of the selectable input.

15. The LIDAR device of claim 11, wherein the vehicle comprises a vehicle configured to operate in an autonomous mode.

16. The LIDAR device of claim 11, wherein:

for each selectable photodiode circuit, the selectable photodiode circuit being configured to provide the selectable input to the receiving circuit when the switchable power supply operates in the low state comprises the PIN diode being forward biased when the switchable power supply operates in the low state; and the selectable photodiode being configured to isolate the selectable input from the receiving circuit when the switchable power supply operates in the high state comprises the PIN diode being reverse biased when the switchable power supply operates in the high state.

17. An imaging device comprising:

a receiving circuit; and an array of selectable photodiode circuits, wherein each selectable photodiode circuit comprises:

(i) a photodiode comprising a photodiode anode and a photodiode cathode, wherein the photodiode is configured to generate a selectable input, (ii) a bias voltage source connected to the photodiode cathode, (iii) a connecting resistor connected to the photodiode anode, (iv) a switchable power supply connected to the connecting resistor, wherein the switchable power supply is configured to operate in a high state and a low state, and (v) a PIN diode comprising a PIN anode and a PIN cathode, wherein the PIN cathode is connected to the photodiode anode and the connecting resistor, and the PIN anode is connected to the receiving circuit, wherein the selectable photodiode circuit is configured to (a) provide the selectable input to the receiving circuit when the switchable power supply operates in the low state and (b) isolate the selectable input from the receiving circuit when the switchable power supply operates in the high state.

18. The imaging device of claim 17, wherein the imaging device comprises a medical imaging device.

19. The imaging device of claim 17, wherein, for each selectable photodiode circuit, the receiving circuit is configured to output to a computer system an output that is a function of the selectable input.

20. The imaging device of claim 17, wherein, for each selectable photodiode circuit:
  the selectable photodiode circuit being configured to provide the selectable input to the receiving circuit when the switchable power supply operates in the low state comprises the PIN diode being forward biased when the switchable power supply operates in the low state; and
  the selectable photodiode circuit being configured to isolate the selectable input from the receiving circuit when the switchable power supply operates in the high state comprises the PIN diode being reverse biased when the switchable power supply operates in the high state.

* * * * *